United States Patent [19]

Biglione et al.

[11] Patent Number: 4,849,472
[45] Date of Patent: Jul. 18, 1989

[54] HIGH-TENACITY, HIGH-FLEXIBILITY POLYMERIC BLENDS

[75] Inventors: Gianfranco Biglione, Mantova; Gian C. Fasulo, San Silvestro Di Curtatone, both of Italy

[73] Assignee: Montedipe S.p.A., Milan, Italy

[21] Appl. No.: 48,889

[22] Filed: May 12, 1987

[30] Foreign Application Priority Data

May 14, 1986 [IT] Italy ................................ 20433 A/86

[51] Int. Cl.[4] ...................... C08L 23/06; C08L 25/04; C08L 51/04; C08L 51/06
[52] U.S. Cl. ........................................ 525/86; 525/75; 525/238; 524/504; 521/139
[58] Field of Search .................. 525/240, 211, 238, 75, 525/86

[56] References Cited

U.S. PATENT DOCUMENTS

| | | | |
|---|---|---|---|
| 4,020,025 | 4/1977 | Zeitler et al. | 525/96 |
| 4,101,050 | 7/1978 | Buckler et al. | 521/123 |
| 4,503,187 | 3/1985 | Gunesin et al. | 525/240 |
| 4,690,976 | 9/1987 | Hahnfeld | 525/75 |
| 4,704,431 | 11/1987 | Stuart et al. | 525/75 |

FOREIGN PATENT DOCUMENTS 57-135845 8/1982 Japan .

OTHER PUBLICATIONS

Barentsen et al.–Mechanical Prop. of PS/EP Blends—British Polymer Journal Vol. 10 pp. 17–22 2/77.

*Primary Examiner*—Carman J. Seccuro
*Attorney, Agent, or Firm*—Stevens, Davis, Miller & Mosher

[57] ABSTRACT

Thermoplastic, high-tenacity, high-flexibility polymeric blends suitable for obtaining molded and thermoformed shaped articles comprising a styrene polymer or copolymer reinforced with ethylene-propylene-diene (EPDM) rubber and an amount higher than 15% by weight of polyethylene.

5 Claims, No Drawings

HIGH-TENACITY, HIGH-FLEXIBILITY POLYMERIC BLENDS

DESCRIPTION OF THE INVENTION

The present invention relates to a thermoplastic polymeric blend endowed with high tenacity and high flexibility characteristics.

More particularly, the present invention relates to a thermoplastic blend endowed with high tenacity and high flexibility, particularly suitable for the injection molding and thermoforming of compact or foamed pieces or shaped articles for use in the fields of packaging, household electrical appliances, motor cars, telectronics, etc.

The polymeric blend of the present invention comprises a styrene polymer or copolymer reinforced with ethylene-propylene-diene rubber (EPDM), and polyethylene in an amount higher than 15% by weight with respect to the blend.

The term "polyethylene" comprises an ethylene polymer having a density of from 0.90 to 0.97, such as, for example, the polymers known as low-density polyethylene (LDPE), linear low-density polyethylene (LLDPE), and high-density polyethylene (HDPE).

The term "styrene polymer or copolymer reinforced with ethylene-propylene-diene (EPDM) rubber", comprises a polymeric material consisting of:

(a) a rigid matrix constituted by polystyrene, or by a styrene copolymer containing up to 40% by weight of an acrylic monomer, and (b) an elastomeric phase dispersed in the rigid matrix and constituted by EPDM rubber either totally or partly grafted with chains of polystyrene or of styrene-acrylic copolymer of the rigid matrix.

The EPDM rubber in the end product may range from 5 to 50% by weight of the polymeric material.

The term "acrylic monomer", comprises above all, and preferably, acrylonitrile; however, other ethylenically-unsaturated acrylic monomers, such as methacrylonitrile, may be used with similar advantages.

The styrene polymer or copolymer reinforced with EPDM rubber may be used as such, or blended with polystyrene, or with a styrene copolymer, such as styrene-acrylonitrile (SAN) copolymer, in an amount of up to 50% by weight.

The styrene polymer or copolymer reinforced with EPDM rubber may be obtained by either dissolving or dispersing the EPDM rubber into the styrenic monomer or mixture of monomers, optionally in the presence of a solvent, and polymerizing the resulting dispersion by mass, suspension, or continuous-mass polymerization as disclosed, e.g., in Italian Pat. No. 792,279 and in UK Pat. No. 2,059,427.

In the polymeric blend of the present invention, the polyethylene may range from an amount higher than 15% by weight up to 90% by weight, and correspondingly the styrene polymer or copolymer reinforced with EPDM rubber, may range from 10% up to an amount lower than 85% by weight. However, when the polyethylene/EPDM weight ratio is higher than 1.5, the weight ratio of the rigid phase to the EPDM rubber, or elastomeric phase, in the polymeric blend should not exceed 3.5.

Preferably, the amount of the polyethylene in the polymeric blend of the present invention is not higher than 60% by weight.

The preparation of the polymeric blend according to the invention may be carried out by blending the starting polymeric products, in pellet form, in a mill. The blend is then processed in the plastic state, at high temperature, in a screw-type extruder-pelletizer.

The polymeric blends of the invention are endowed with good mechanical properties, have a high degree of homogeneity, are not subject to delamination, and are suitable for injection-molding and thermoforming according to conventional methods.

The polymeric blends of the present invention may also contain different agents, such as, e.g., stabilizers, flame-retarding agents, antistatic agents, and so forth, for the manufacturing of particular shaped articles endowed with UV-resistance, self-extinguishing properties, low surface attraction for dusts, etc.

Foaming agents may be furthermore added to the blends of the present invention. As such foaming agents, there may be used:

(a) chemical foaming agents, such as, e.g., azodicarbonamide, which are added to the polymeric blend and are decomposed inside the apparatus (either injection-press or extruder) for obtaining lighter objects or semi-finished articles having a density up to three times lower than that of the starting product;

(b) physical foaming agents, such as, e.g., the short-chain aliphatic hydrocarbons (propane, butane, pentane, etc.), or halocarbons, such as Freon, by which the pellets of the polymeric blend are impregnated and then foamed and sintered, for the purpose of obtaining articles having density values up to 30 times lower than that of the starting product.

EXAMPLES 1–4

The components of the blend as reported in the following Table are blended on a rotary-arms mill, at 100 rpm, and the resulting blend is extruded on a twin-screw Werner & Pfleiderer ZSK53 extruder, at a temperature of the molten polymer of 240° C.

The extruded rods, after water-cooling, are cut into pellets. The pellets are fed to an injection press for specimen molding.

The properties as determined on the specimens thus obtained are reported in the following table:

TABLE

| | EXAMPLES | | | |
|---|---|---|---|---|
| | 1 | 2 | 3 | 4 |
| COMPOSITIONS | | | | |
| Polyethylene with density = 0.918 (Escorene LL 1201(R)) M.I. = 1(*) | | | 50 | 38 |
| Polyethylene with density = 0.926 (Escorene LL 1001 (R)) M.I. = 0.8(*) | 20 | 30 | | |
| Styrene/arcrylonitrile 75/25 copolymer reinforced with 25% of EDPM | 80 | 70 | 50 | 38 |
| Stryene/acrylonitrile (SAN) 75/25 copolymer | | | | 24 |
| EPDM content | 20 | 17.5 | 12.5 | 9.5 |

TABLE-continued

|  |  |  | EXAMPLES | | | |
| --- | --- | --- | --- | --- | --- | --- |
|  |  |  | 1 | 2 | 3 | 4 |
| Content of styrene/acrylonitrile (SAN) copolymer |  |  | 60 | 52.5 | 37.5 | 52.5 |
| Polyethylene/EPDM ratio by weight |  |  | 1 | 1.7 | 4 | 4 |
| SAN/EPDM ratio by weight |  |  | 3 | 3 | 3 | 5.5 |
| PROPERTIES | METHOD | UNITS |  |  |  |  |
| COMPATIBILITY |  |  | B(1) | B(1) | B(1) | delaminates |
| IZOD RESILIENCE AT 23° C. on 3.2 mm thick specimens | ASTM D256 | J/m | 310 | 350 | 620 | 110 |
| TENSILE STRENGTH | ASTM D638 |  |  |  |  |  |
| yield strength |  | N/mm$^2$ | 14.5 | 13.2 | 10.5 | 18 |
| ultimate tensile strength |  | N/mm$^2$ | 22 | 19.3 | 16.5 | 20 |
| elongation at break |  | % | 37 | 55 | 90 | 20 |
| elastic modulus |  | N/mm$^2$ | 1050 | 850 | 500 | 950 |

(*) M.I. = Melt-Flow Index, as measured at 190° C. and 2.13 kg, expressed as g/10 minutes
(1) B = Good

I claim:

1. A high-tenacity, high-flexibility polymeric blend comprising a styrene homopolymer or copolymer with up to 40% by weight acrylic monomer reinforced with an ethylene-propylene-diene (EPDM) rubber and an amount higher than 15% to 38% by weight, with respect to the blend, of polyethylene, the amount of the ethylene-propylene diene (EPDM) in the mixture being from 5 to 50% by weight, with the proviso that when the polyethylene/EPDM ratio is higher than 1.5, the weight ratio of the rigid phase to the EPDM rubber, in the polymeric blend, does not exceed 3.5.

2. A polymeric blend according to claim 1, wherein the polyethylene has a density of from 0.90 to 0.97.

3. A polymeric blend according to claim 1, wherein the styrene homopolymer or copolymer reinforced with EPDM rubber is a polymeric material constituted by:
   (a) a rigid matrix of polystyrene, or by a styrene copolymer containing up to 40% by weight of an acrylic monomer, and
   (b) an elastomeric phase dispersed into the matrix and consisting essentially of EPDM rubber either totally or partly grafted with chains of polystyrene or of styrene-acrylic copolymer of the rigid matrix.

4. A polymeric blend according to claim 1, wherein the styrene homopolymer or copolymer reinforced with EPDM rubber is blended with polystyrene, or with a styrene copolymer, in an amount of up to 50% by weight.

5. A polymeric blend according to claim 4, wherein the styrene copolymer is styrene-acrylonitrile.

* * * * *